United States Patent [19]

Arase et al.

[11] Patent Number: 4,799,843

[45] Date of Patent: Jan. 24, 1989

[54] LIFTING DOWN APPARATUS FOR A MULTI-STAGE SHELF ASSEMBLY

[75] Inventors: Akira Arase; Ichiro Wada, both of Yokohama, Japan

[73] Assignee: Okamura Corporation, Yokohama, Japan

[21] Appl. No.: 271,788

[22] Filed: Mar. 22, 1988

[30] Foreign Application Priority Data

Mar. 31, 1987 [JP] Japan .................................. 62-78770

[51] Int. Cl.⁴ ............................................ B65G 47/68
[52] U.S. Cl. .................... 414/331; 414/917;
198/435; 221/79; 221/129
[58] Field of Search ................ 221/79, 129; 198/435;
414/917, 476, 478, 482, 331

[56] References Cited

U.S. PATENT DOCUMENTS

| | | | |
|---|---|---|---|
| 2,398,949 | 4/1946 | McClain | 414/917 X |
| 2,406,786 | 9/1946 | Aulcland | 414/917 X |
| 4,155,524 | 6/1979 | Serafin | 414/917 X |
| 4,245,657 | 1/1981 | Jordan et al. | 414/917 X |
| 4,247,238 | 1/1981 | Inhauser et al. | 414/917 X |
| 4,673,328 | 6/1987 | Shiels | 414/917 X |

FOREIGN PATENT DOCUMENTS 940556  8/1960  United Kingdom .

Primary Examiner—Andres Kashnikow
Assistant Examiner—Kevin P. Weldon
Attorney, Agent, or Firm—Poms, Smith, Lande & Rose

[57] ABSTRACT

The lifting down apparatus for a multi-stage shelf assembly comprises a base, a pair of arms pivotally secured to the base so as to form a parallel linking mechanism together with the base, and foldable frames having link members which connect with the arms, a plurality of rotary shelves pivotally mounted onto one of the arms of the foldable frames at their basic portions by spacing in the longitudinal direction, supporting members attached to the other arm so that they may support the free end portions of the rotary shelves, whereby when the foldable frames rise from the base, the rotary shelves separate stepwisely, and when the foldable frames fall down, the rotary shelves arrange on the same plane. Accordingly, delivery efficiency can be greatly improved.

6 Claims, 5 Drawing Sheets

LIFTING DOWN APPARATUS FOR A MULTI-STAGE SHELF ASSEMBLY

BACKGROUND OF THE INVENTION

The present invention relates to a lifting down apparatus for a multi-stage shelf assembly to be used when articles are lifted down from shelves of a rotary storage or the like.

Prior Art

Conventionally, as disclosed in Japanese Utility Model Publication No. 59-28962, a rotary storage is adapted so that, according to control by computer, an endless linking means may be circulated and run to carry out the following operation, that is, a plurality of frames assembled to cubical shapes are sorted out on each shelf vertically arranged as a multi-stage shelf assembly, and on each of the shelves a plurality of containers connected with one another by means of the endless link means are rotated about a vertical shaft so that any desired containers may be stopped at any article taking-in and taking-out port provided at the side of each of the shelves.

The rotary storage of this type in which containers are disposed on trays so as to be able to be taken-in and taken-out freely, and an automatic taking-in and taking-out machine is provided has been widely used in a factory etc. The automatic taking-in and taking-out machine in the rotary storage of this type has a construction in which a lifting bed is reciprocally shifted in the vertical direction along the side surface of the rotary storage so that any article, for example, a container, may be lifted down from each of the shelves or put the container thereon. However, even if a plurality of containers are put on or lifted down from the lifting bed at a time, it takes considerably longer time to shift the lifting bed in the vertical direction. Thus, there is a disadvantage in the above described prior art that it is quite difficult to improve efficiency of the rotary storage.

SUMMARY OF THE INVENTION

The present invention is made to solve the afore-described disadvantage of the conventional lifting down apparatus.

It is a main object of the present invention to provide a lifting down apparatus for a multi-stage shelf assembly which can leave a number of articles extracted from each of the shelves at a time.

The lifting down apparatus for a multi-stage shelf assembly according to the present invention comprises a base, a pair of arms pivotally mounted onto the base at their lower ends so as to form a parallel linking means together with the base by making it as a fixed link member and foldable frames composed of link members each of which connects free ends of the arms mutually, a plurality of rotary shelves pivotally mounted onto one of the arms of the foldable frames at their basic portions by spacing in the longitudinal direction, supporting members attached to the other arm so that they may support the free end portions of the rotary shelves, whereby when the foldable frames rise from the base, the rotary shelves separate stepwisely, and when the foldable frames fall down, rotary shelves arrange on the same plane, and a driving means for pivoting the foldable frames with a predetermined opened angle.

In the present lifting down apparatus after putting articles on each of the rotary shelves of the foldable frames rising from the base, if the foldable frames are fallen down on the base by the driving means, articles on each of the rotary shelves are disposed in a line and they can be delivered at one time from the storage.

DESCRIPTION OF THE PREFERRED EMBODIMENT

Figure 1:
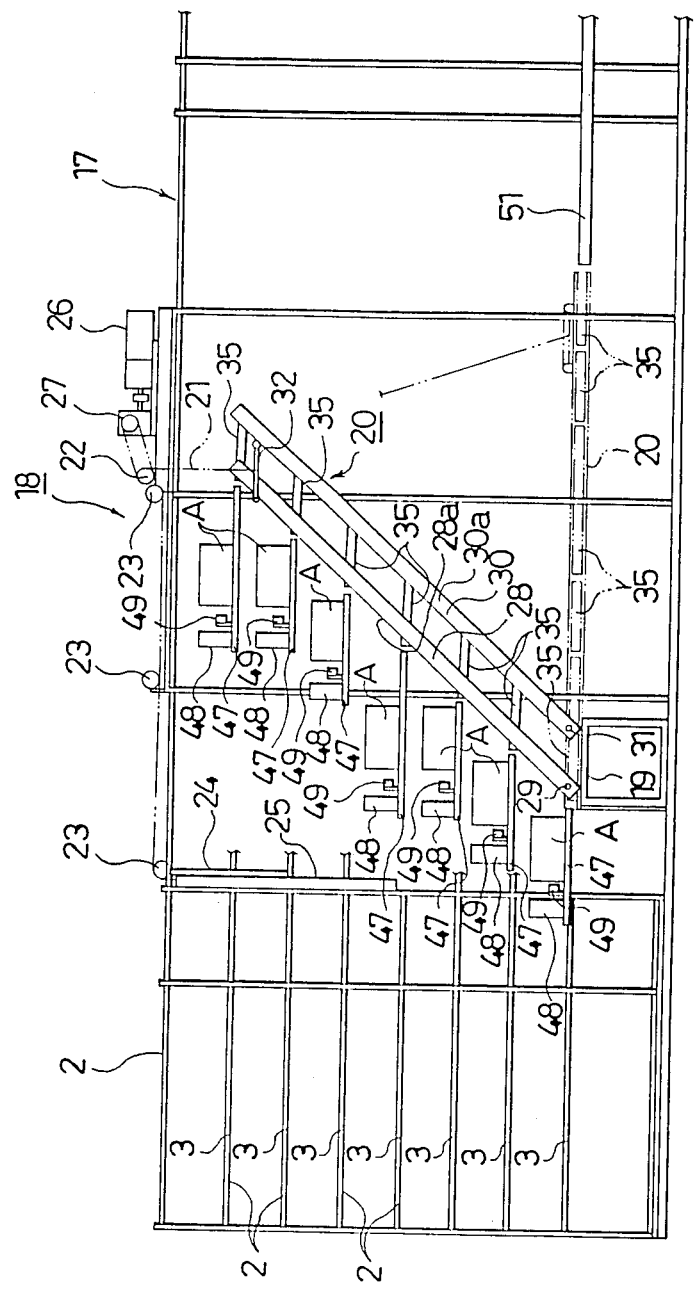
FIG. 1 is a partially broken elevation view showing an embodiment of the present invention.

Hereinafter, descriptions of the present invention are given regarding a preferred embodiment with reference to the accompanying drawings.

reference number (1) designates a cubic frame in the inside of which is partitioned to seven staged shelves (3) with horizontal members (2). In each of the shelves (3) there are laid horizontally an outer rail (4) having an elliptical orbit and a set of linear inner rails (5) being in parallel with each other, and a plurality of trays (6) each having rollers underside thereof are guided by the rails (Refer to FIG. 2).

Vertical shafts (7) and (8) are respectively installed at both end parts of the frame (1), and a driving sprocket (9) is secured to the vertical shaft (7) and a follower sprocket (10) is also secured to the vertical shaft (8), and an endless tractive chain (11) is wound on the sprocket (10). Each of the trays (6) is secured to the tractive chain (11), and the sprocket (9) is associated with a motor (12). Accordingly, when the motor (12) starts to drive 6, a number of the trays (6) are driven to travel on the elliptical orbit around the vertical shafts in the inside of the frame (1). Reference number (13) designates an automatic taking-in and taking-out machine. Two automatic taking-in and taking-out machines (13) are juxtaposed at the front face of the right end part of the frame (1). Each of the automatic machines (13) comprises a longitudinal frame (14) of a rectangular shape and a lifting bed (15) which performs ascent and descent movements in this longitudinal frame (14). On the lifting bed (15) there are mounted pressuring means (16), such as air compressors or the like, for loading containers A onto the trays (6). The afore-mentioned rotary storage (17), the automatic taking-in and taking-out machine (13) and the pressuring means (16) have been already well and publicly known, so that no detailed description is added.

Next, minute descriptions regarding a lifting down apparatus for a multi-stage shelf assembly according to the present invention will be given.

Reference number (19) designates a base, and a foldable frame (20) which will be minutely described hereinafter is pivotally mounted on the base (19) at its lower end portion so that it may be rotated between the slant rising position shown in FIG. 1 and the falling down position thereof shown in imaginary lines in FIG. 1. A tractive chain (21) is secured to the free end portion of the foldable frame (20) at it one end, and the other end of the tractive chain (21) is turned on a driving sprocket (22) provided on the upper face of the frame (1), and then it is guided to three follower sprockets (23) disposed at three appropriate positions on the uppermost horizontal member. The terminal end of the tractive chain (21) is secured to the upper end of a weight (25) which is provided in a guiding tube (24) so as to be able to perform up and down motion.

Reference number (26) indicates a driving means, that is, a reversible motor.

Output of the reversible motor is transmitted to the sprocket (22) through a reduction gear (27). Accordingly, when the motor (26) sets into motion, that is, according to positive rotation or inverse rotation, the foldable frame (20) is raised or fallen down.

Detailed descriptions will be given regarding the foldable frame (20). A ladder shaped inner frame (28) comprises a pair of arms (28a) (28b) which are pivotally mounted to a horizontal shaft (29) the basic end portion of which is attached to the base (19), and seven horizontal spacing members (28c) which connect both undersides of these arms (28a) and (28b) at equidistance with one another.

Reference number (30) designates ladder-shaped outer frames having width a little wider than that of the inner frame (28) and capable of being overlapped, and comprises a pair of arms (30a) and (30b) pivotally mounted to a horizontal shaft (31) which is installed on the base (19) and spaced a predetermined distance from the horizontal shaft (29), and seven parallel spacing members (30c) which connect the undersides of the both arms (30a) and (30b). Free end portions of the outer frames (30) and the inner frames (28) are mutually connected with one another by horizontal connecting links (32) to form a parallel link means of a rhomboid in which the base (19) is a fixing link. The one end of the tractive chain (21) is secured to an upper end of the central part of the connecting links (32) (refer to FIG. 1).

Figure 5:
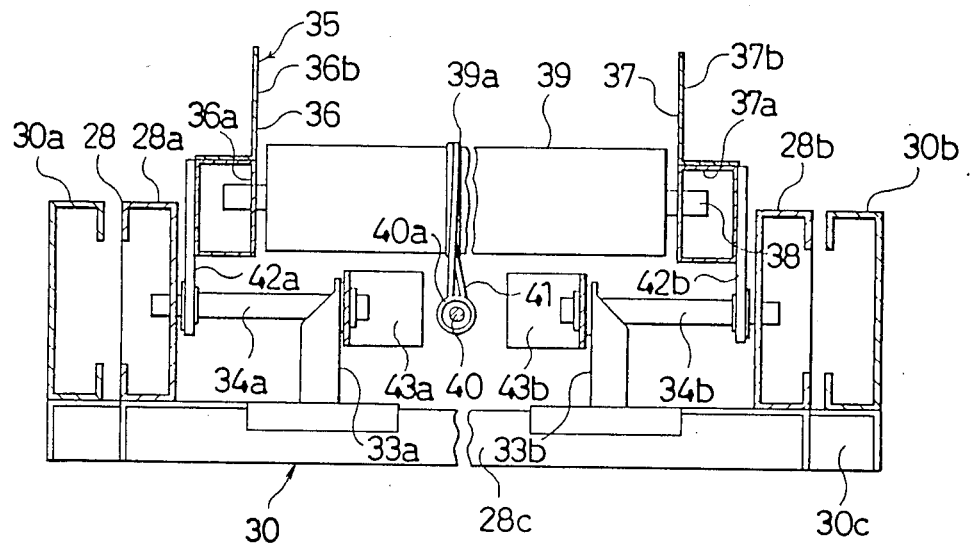
FIG. 5 is a longitudinally sectioned view partially broken at the central part along V—V line shown in FIG. 4.

On the spacing members (28c) of the inner frames (28), as shown in FIG. 5, a set of brackets (33a) and (33b) are erected, and between the bracket (33a) and the arm (28a) a shaft (34a) is horizontally provided, and between the rear bracket (33b) and the arm (28b) there is provided horizontally a shaft (34b), respectively. Each of rotary shelf assembly (35) comprises a front part container guide (36) composed of an L shaped member (36b) secured onto an angular tube (36a), a rear part container guide (37) composed of an L shaped member (37b) secured onto an angular tube (36a), six parallel shafts (38) installed between the both angular tubes (36a) and (37a), and rollers (39) pivotally provided to the respective shafts (38).

Between each pulley (40a) provided on a driven shaft (40) which is rotated by a driving means (not shown) mounted on the rotary shelf assembly (35) and directed to a direction which intersects at right angles with that of each of the rollers (39) and each of annular grooves (39a) bored on the circumferential periphery of the respective rollers a belt (41) is turned, and each of the rollers (39) is capable of rotating (of course, it is also possible to rotate each of the rollers (39) by means of a motor provided in the roller). At both the front and the rear parts of the left side end portion of the rotary shelf assembly (35) hanging down pieces (42a) and (42b) are mounted, and the lower end portions of these hanging down pieces (42a) and (42b) are pivoted to the shafts (34a) and (34b), respectively.

Reference number (43) designates a stopper the left end portion of which comprises a set of rotary rods (43a) and (43b) pivotally mounted on the outer circumferences of the inner end portions (34a) and (34b) of the shaft (34a), a basic part displaced between the upper surfaces of free end portions of the rotary rods (43a) and (43b), and the upper end portion which is a thin and crank-like stopper piece (43c). On the front and rear faces of the right end part of.the rotary rod (43a) there are provided two pieces projecting horizontally.

Figure 6:
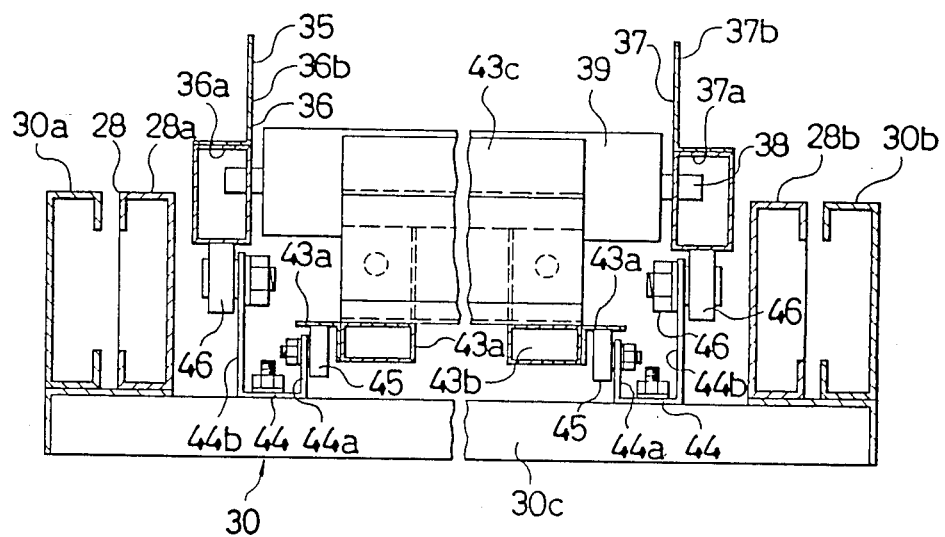
FIG. 6 is a longitudinally sectioned view partially broken at the central part along line VI—VI shown in FIG. 4.

As shown in FIG. 6, a set of brackets (44) are attached to the spacing member (30c) of the outer frame (30). Each of the brackets (44) is an angled U-shape which has a short piece (44a) in the inner side and a long piece (44b) in the outer side. To each of the short pieces (44a) a supporting roller (45) having smaller diameter is horizontally rotatably mounted, and to each of the long pieces (44b) a supporting roller (46) having a slightly larger diameter is mounted so as to be able to rotate freely in the horizontal direction.

Figure 2:
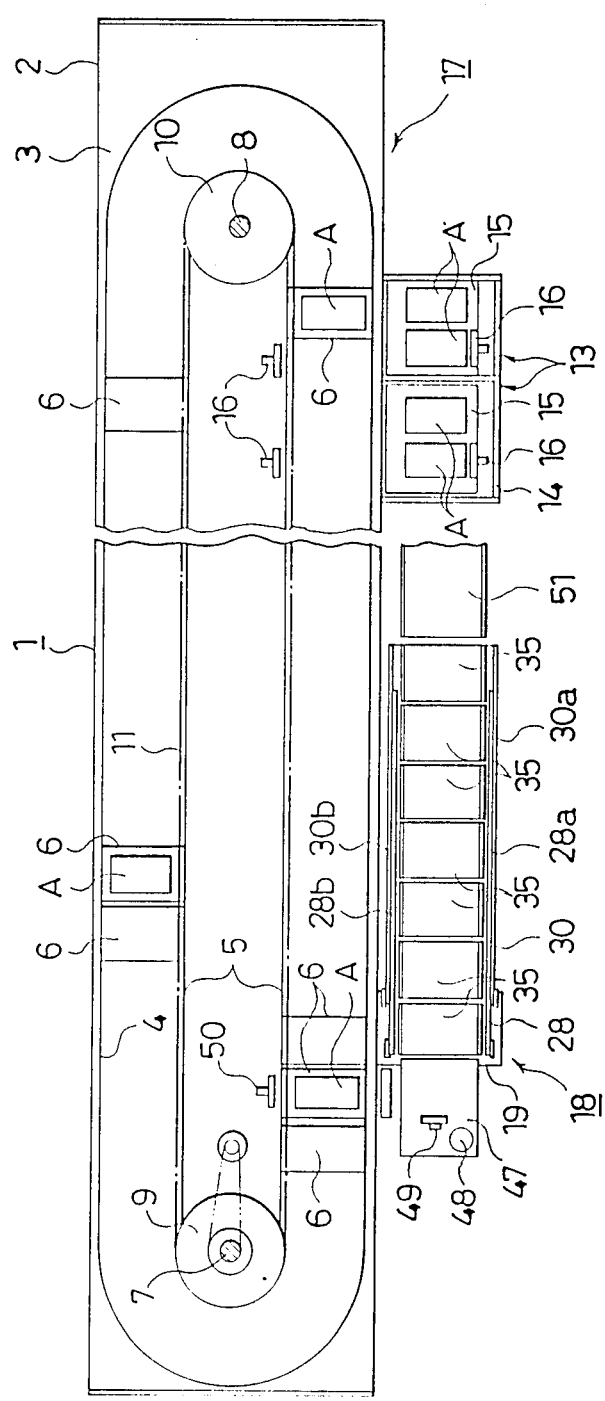
FIG. 2 is also a partially broken elevation view of the same.

As shown in FIG. 1, opposing to the rotary shelf assembly (35) having seven staged shelves on the foldable frames (20) which rise angles of about 45 degrees with respect to the horizontal plane, at the front face side of the rotary storage (17) there are equipped with article receiving ports (47) stepwisely one at each of the stages. At each of the article receiving ports (47) there are provided a motor (48) and a pressuring means (48) which is driven by the motor (47) to make horizontally reciprocal movements. Further, as shown in FIG. 2, at the rear part of the tray (6) on each of the shelves (3) which opposes to the respective article receiving parts (47) there is equipped a pressuring means (50). Reference number (51) indicates a horizontal conveyer which opposes to the right end part of the foldable frame (20) when it is fallen down and in its prostrate condition and feeds the container A.

Next, detailed description with respect to operation of the lifting down apparatus of the multi-stage shelf assembly (18) will be given hereinafter. In FIG. 1 there is shown the foldable frames (20) which are slantingly raised by the tractive chain (21) with angles of about 45 degree. From each of the shelves (3) of the rotary storage (17) arranged in the vertical direction respective desired containers A is selected by means of control of a computer, and pushed out to each of the vertically arranged article receiving parts (47).

Each of the containers A on the respective article receiving parts (47) is transported to each of the rotary shelves of the foldable frames (20).

Figure 3:
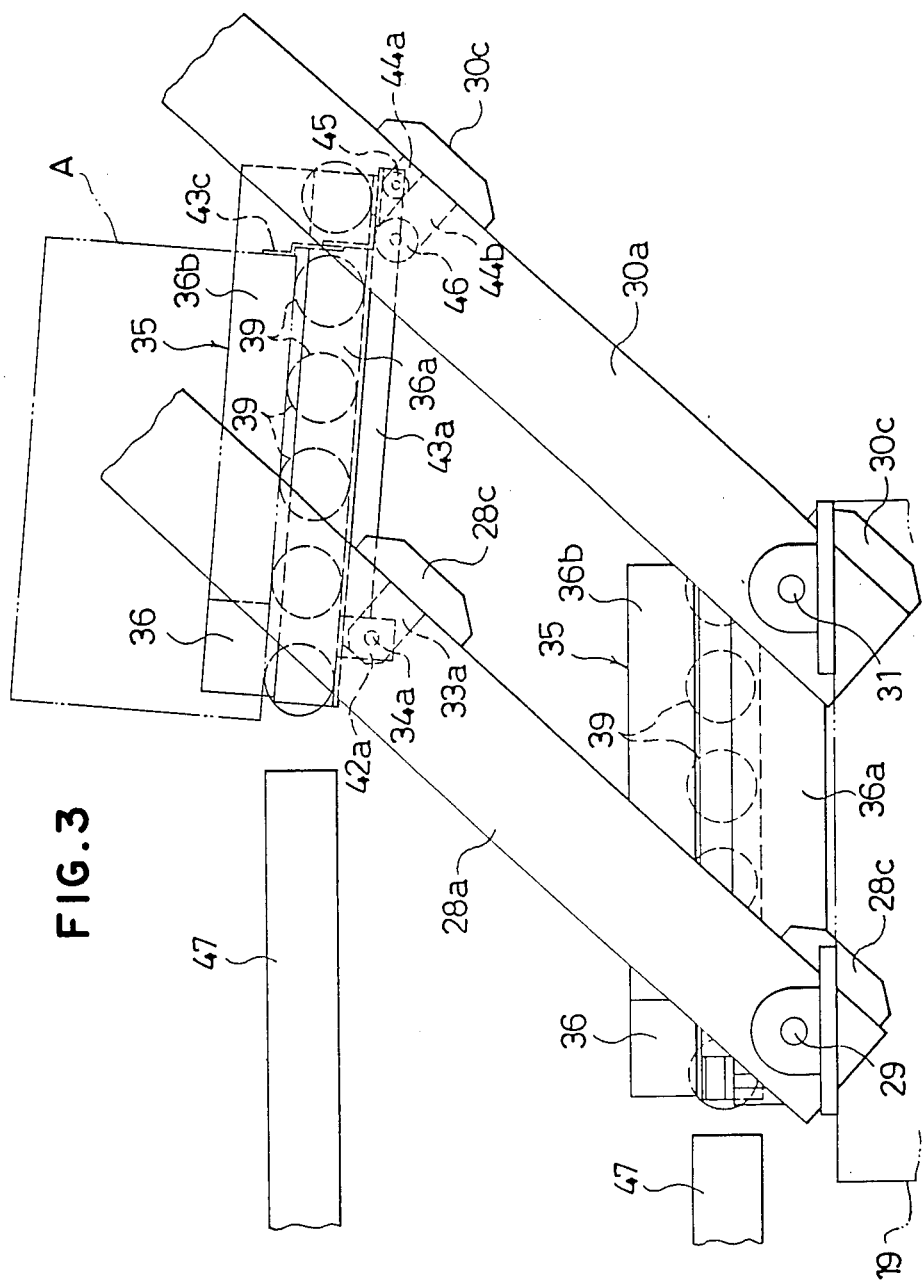
FIG. 3 is an enlarged elevation view of a foldable frames shown in FIG. 1 in which only a base part is partially broken.

As shown FIG. 3, each of the container guides (36) and (37) slants slightly to the right with each of lower right end parts thereof being placed on the supporting roller (36) of the arm (30a), and the horizontally projecting pieces (43d) (43d) at the right end portion of the stopper (43) are mounted on the supporting roller (45), and the upper end portion of the stopper piece (43c) projects between the rollers (39). Accordingly, the container A which transported to the rotary shelf assembly (35) from the article receiving parts is prevented from falling down by engaging its lower edge at the right end portion with the stopper piece (43c). When each of the containers A is finished to shift the respective shelves of the rotary shelf assembly (35), the motor (26) on the frame (1) begins to rotate, and the foldable frames (20) are rotated with angles of about 45 degree in the clockwise direction to make the frames (20) prostrate condition so that arms (28) and (30) may be overlapped.

Figure 4:
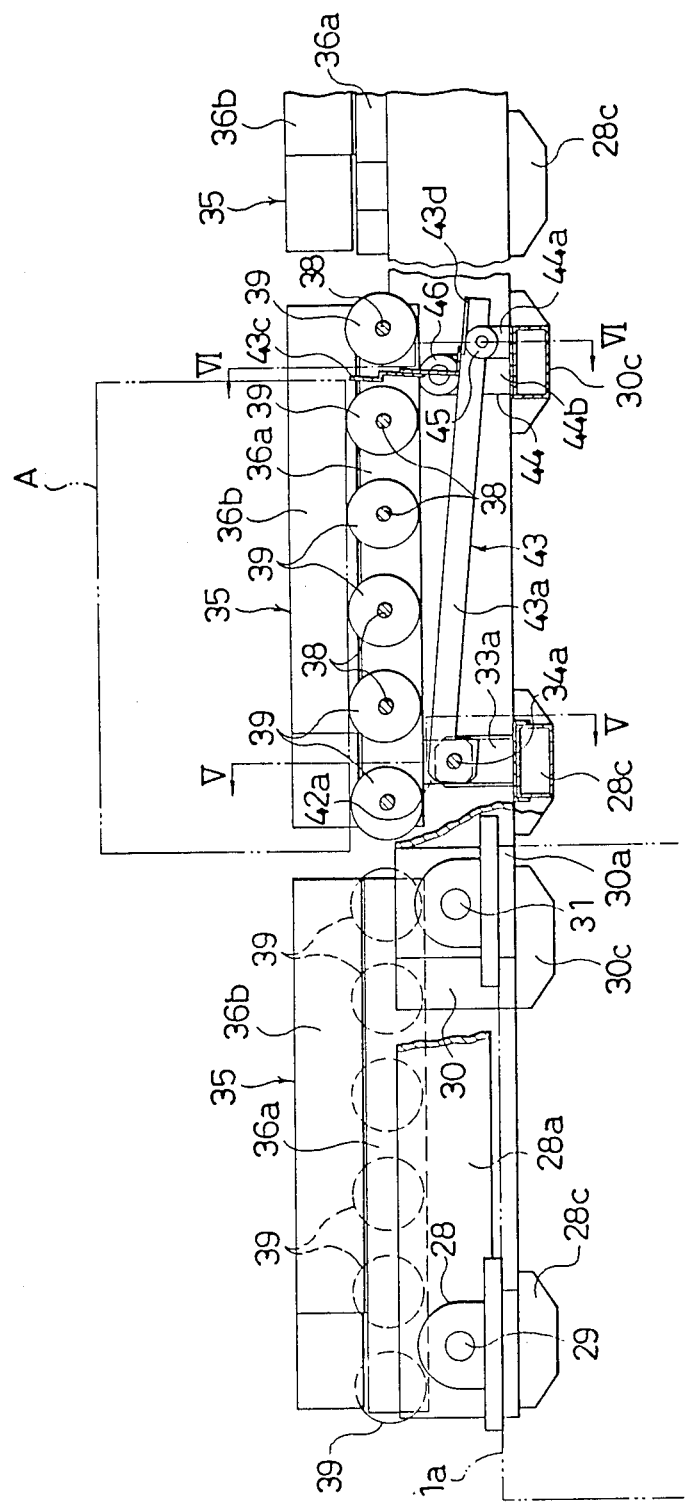
FIG. 4 is a partially broken elevation view showing delivering conditions of the foldable frames shown in FIG. 3.

At the state shown in FIG. 4, the shelves of the rotary shelf assembly (35) arrange in a series line in the longitudinal direction (with respect to the face of FIG. 4). The reason lies in that lengths of the long pieces (44b) of the brackets (44) on the spacing members (30c) which support the supporting roller (46) are previously defined. The projecting pieces (43d) (43d) which contact with the supporting rollers (45) are relatively lower than the afore-mentioned supporting roller (46) for the short pieces (44a) smaller than that of the long pieces (44b). Accordingly, the stopper piece (43c) disappears from the upper face of the roller (39) to the lower thereof, and then function for stopping the container A is released. Therefore, when each of the rollers (39) between the both container guides (36) and (37) is rotated by means of the driving means (not shown), containers A on the respective shelves on the rotary shelf assembly (35) are lumped together (in the case shown in FIG. 1 seven containers being lumped together), and can be shifted in a lump to a conveyor (51). Thus, prompt delivery from the storage can be achieved.

In the afore-described embodiment the foldable frames are rotated by means of the tractive chain, however, it is possible to secure the foldable frames to the horizontal shaft so that they may be rotated by rotating the horizontal shaft, or it is also possible to rotate the foldable frame by connecting the free end of the rotatable tractive chain with the intermediate part of the foldable frame. Further, rollers as the supporting members of the rotary shelf assembly can be substituted for a link mechanism which pivotally connects the free end portion of one of the arms to the other arm. In addition, other than loading articles (containers) through article receiving parts to the rotary shelf assembly, it is possible to load articles directly to one rotary shelf assembly from other rotary shelf assembly by pressuring means. The present invention is not only used by being installed to a multi-stage rotary storage but can be used as lifting down apparatus for other multi-stage shelf assembly.

In the lifting down apparatus for the multi-stage shelf assembly according to the present invention, after the articles having been loaded onto each of the rotary shelves of the rising foldable frames, if the foldable frames are prostrated, all the rotary shelves arrange in a series, so that equal number of articles as that of the shelves can be delivered from the storage. Thus, efficiency of delivery of articles can be highly improved.

What is claimed is:

1. A lifting down apparatus for a multi-stage shelf assembly characterized by comprising:

a base;

foldable frames having a set of arms the lower ends of which are pivotally secured to said base to form a parallel link mechanism in which said base is a fixed link member and a connecting link mechanism for mutually connecting free ends of said arms with each other;

a plurality of rotary shelf assemblies one end of which is pivotally secured to one of said arms of said foldable frames at an interval in the longitudinal direction;

supporting members secured to the other arm to support the free ends of said, plurality of rotary shelf assemblies so that, when said foldable frames are being raised from the base, said plurality of rotary shelf assemblies separating sequentially, and when said foldable frames are lowered down on the base, said rotary shelf assemblies arrange in a line on the same plane; and a driving means for pivotally moving said foldable frames at a predetermined angle.

2. A lifting down apparatus for a multi-stage shelf assembly as defined in claim (1), wherein said driving means are a tractive chain one end of which is securedly connected to said foldable frames and a motor for moving said tractive chain reciprocally through a sprocket.

3. A lifting down apparatus for a multi-stage shelf assembly as defined in claim (1) or claim (2), wherein said foldable frames are installed adjacent to a rotary shelf assembly storage.

4. A lifting down apparatus for a multi-stage shelf assembly as defined in claim (1) or (2), wherein said foldable frames are connected with said rotary storage through an article receiving part which serves to feed an article to said rotary shelf assembly.

5. A lifting down apparatus for a multi-stage shelf assembly as defined in claim (1) or (2), wherein a stopping means for preventing the article from falling down from the free end portion of said rotary shelf assembly is further provided.

6. A lifting down apparatus for a multi-stage shelf assembly as defined in claim (5), wherein said stopping means is pivoted to said arm at its basic end part and the free end thereof is capable of appearing and disappearing from the plane of said rotary shelf assembly on which the articles are to be placed.

* * * * *